US012529623B2

(12) United States Patent
Bao et al.

(10) Patent No.: US 12,529,623 B2
(45) Date of Patent: Jan. 20, 2026

(54) METHOD FOR DETERMINING DISTRIBUTED BIREFRINGENCE VARIATIONS IN A POLARIZATION-MAINTAINING OPTICAL FIBER

(71) Applicant: HUAWEI TECHNOLOGIES CO., LTD., Guangdong (CN)

(72) Inventors: Xiaoyi Bao, Ottawa (CA); Yuan Wang, Ottawa (CA)

(73) Assignees: HUAWEI TECHNOLOGIES CANADA CO., LTD., Kanata (CA); UNIVERSITY OF OTTAWA, Ottawa (CA)

( * ) Notice: Subject to any disclaimer, the term of this patent is extended or adjusted under 35 U.S.C. 154(b) by 254 days.

(21) Appl. No.: 18/362,145

(22) Filed: Jul. 31, 2023

(65) Prior Publication Data

US 2025/0044191 A1    Feb. 6, 2025

(51) Int. Cl.
- *G01N 21/63*     (2006.01)
- *G01M 11/00*     (2006.01)
- *G01K 11/322*    (2021.01)
- *G02B 6/02*      (2006.01)

(52) U.S. Cl.
CPC ........... *G01M 11/37* (2013.01); *G01K 11/322* (2021.01); *G01N 2021/638* (2013.01); *G02B 6/02109* (2013.01)

(58) Field of Classification Search
CPC ................. G01M 11/37; G01K 11/322; G01N 2021/638; G02B 6/02109
See application file for complete search history.

(56) References Cited

U.S. PATENT DOCUMENTS

| | | | |
|---|---|---|---|
| 2001/0053012 A1* | 12/2001 | Shikata | H04B 10/25137 398/187 |
| 2014/0083197 A1* | 3/2014 | Zadok | G01D 5/35348 374/161 |
| 2016/0273999 A1* | 9/2016 | Hotate | G01M 11/39 |

OTHER PUBLICATIONS

Dong et al, "Long-Range and High-Spatial Resolution Distributed Birefringence Measurement of a Polarization-Maintaining Fiber Based on Brillouin Dynamic Grating", Aug. 15, 2013, Journal of Lightwave Technology, vol. 31, No. 16, pp. 2681-2686 (Year: 2013).*

(Continued)

*Primary Examiner* — Michelle M Iacoletti
*Assistant Examiner* — Judy Dao Tran
(74) *Attorney, Agent, or Firm* — BCF LLP (57) ABSTRACT

System and method for determining distributed birefringence variations in a polarization-maintaining optical fiber (PM fiber). The method includes causing a pump signal to be sent into the PM fiber to generate a Brillouin dynamic grating (BDG) therein, causing a first chirped probe optical pulse to be sent into the PM fiber, receiving a first reflected signal, the first reflected signal being a first portion of the first chirped probe optical pulse reflected by the BDG, receiving a second reflected signal, the second reflected signal being a second portion of the first chirped probe optical pulse reflected by the BDG, and determining a variation of birefringence of the PM fiber indicative of a variation of physical disturbance of the PM fiber between times of reflections on the BDG of the first and second reflected signals.

19 Claims, 8 Drawing Sheets

(56) References Cited

OTHER PUBLICATIONS

Xiong et al "Chirped-pulse coherent-OTDR with predistortion", Jan. 25, 2018, Journal of Optics, vol. 20 (Year: 2018).*

Dong et al, Chapter 31 "Characterization of Distributed Birefringence in Optical Fibers" in Handbook of Optical Fibers, 2019, Springer Nature Singapore Pte Ltd, pp. 1227-1257 (Year: 2019).*

Xu et al, "All-polarization maintaining fiber laser and pulse compressor", 2018, IEEE Photonics Technology Letters, vol. 30, pp. 2151-2154 (Year: 2018).*

Zhou et al, "Distributed static and dynamic detection of an acoustic wave in a Brillouin random fiber laser", Apr. 26, 2021, Photonics Research, vol. 9, No. 5, pp. 772-780 (Year: 2021).*

Wang et al, "A novel method for distributed phase birefringence measurement based on chirped pulse φ-OTDR", Jun. 2021, Optica Publishing Group, Optical Fiber Communication Conference (Year: 2021).*

\* cited by examiner

METHOD FOR DETERMINING DISTRIBUTED BIREFRINGENCE VARIATIONS IN A POLARIZATION-MAINTAINING OPTICAL FIBER

CROSS-REFERENCE TO RELATED APPLICATIONS

This is the first application filed for the instantly disclosed technology.

TECHNICAL FIELD

The present disclosure generally relates to optical communications and, in particular, to methods for determining distributed birefringence variations in a polarization-maintaining optical fiber.

BACKGROUND

Birefringence measurement in optical fibers has been widely used for distributed sensing and fiber safety monitoring. Recently, an all-optical way to generate Brillouin dynamic grating (BDG) in PM fiber has attracted extensive attention in recent years. The refractive index of the PM fiber core will be altered temporarily due to the acoustic wave during the Stimulated Brillouin (SBS) effect when two optical waves are counter-propagating along the same axis of the PM fiber with a frequency deviation of Brillouin frequency shift. The strong interaction between two waves generates the acoustic wave through electrostrictive effect.

Other methods for detecting physical disturbances have been proposed. For instance, based on Rayleigh scattering, birefringence can be measured by the spectral correlation between two sets of orthogonally-polarized measurements acquired using a phase-sensitive optical time-domain reflectometer (φ-OTDR). In another instance, birefringence distribution along polarization-maintaining fibers can be measured with high spatial resolution using optical frequency-domain reflectometry (OFDR).

These proposed or known methods are not generally rapid or have high spatial resolution, limiting their ability to detect interference in optical fibers, such as mechanical interference with the fiber during tapping.

To this end, there is an interest in developing systems and methods for detecting mechanical physical disturbances and/or change of birefringence in optical fibers.

SUMMARY

The implementations of the present disclosure have been developed based on developers' appreciation of the limitations associated with the prior art. Developers of the present technology have devised methods and systems for determining distributed birefringence variations in a polarization-maintaining optical fiber (PM fiber). The method is broadly based interrogation of a Brillouin Dynamic grating (BDG) located at an interaction section of a PM fiber, using a time delay measurement in the PM fiber for distributed birefringence variation measurement. A chirped pulse signal for distributed birefringence measurement is sent through the PM fiber, a variation of the birefringence being indicative of physical disturbances (e.g. temperature, strain). The method includes receiving a first reflected signal being a first portion of the chirped probe optical pulse reflected by the BDG and receiving a second reflected signal, the second reflected signal being a second portion of the chirped probe optical pulse reflected by the BDG. A variation of birefringence of the PM fiber is then based on a time delay between reception of the first and second reflected signals.

It is an object of the present invention to provide real-time monitoring of birefringence variations without being limited by an acquisition rate of said monitoring and a spatial resolution that is not limited by pulse width.

In accordance with a first broad aspect of the present disclosure, there is provided a method for determining distributed birefringence variations in a polarization-maintaining optical fiber (PM fiber). The method is executed by a computer-implemented system comprising a controller. The method includes causing a pump signal to be sent into the PM fiber at a first moment in time to generate a Brillouin dynamic grating (BDG) in the PM fiber along a first polarization direction at an interaction region of the PM fiber, the pump signal being polarized in the first polarization direction, causing a first chirped probe optical pulse to be sent into the PM fiber at a second moment in time subsequent to the first moment in time, the first chirped probe signal being polarized in the second polarization direction, the second polarization direction being orthogonal to the first direction, receiving a first reflected signal at a third moment in time, the first reflected signal being a first portion of the first chirped probe optical pulse reflected by the BDG, receiving a second reflected signal at a fourth moment in time, the second reflected signal being a second portion of the first chirped probe optical pulse reflected by the BDG at the interaction region of the PM fiber and determining a variation of birefringence of the PM fiber at the interaction section based on the second, third and fourth moments in time, the variation of birefringence being indicative of a variation of physical disturbance of the PM fiber between times of reflections on the BDG of the first and second reflected signals.

In some non-limiting implementations, causing the first chirped probe optical pulse to be sent comprises producing a first chirped pulse having a linear frequency profile.

In some non-limiting implementations, causing the first chirped probe optical pulse to be sent comprises producing a first chirped pulse having a uniform optical power profile.

In some non-limiting implementations, generating the BDG in the PM fiber includes injecting the pump signal into the PM fiber via a first end and causing the first chirped probe optical pulse to be sent includes injecting the first chirped probe optical pulse into the PM fiber via a second end, the second end being different from the first end.

In some non-limiting implementations, a wavelength profile of the pump signal is centered at 1550 nm.

In some non-limiting implementations, determining the variation of birefringence (ΔB) of the PM fiber at the interaction section includes determining:

$$\Delta B = \frac{\Delta \vartheta_C \cdot n_{gy}}{W \cdot \vartheta_P} \cdot \Delta t$$

where $\Delta \vartheta_C$ is a frequency chirping range of the chirped probe optical pulse, $n_{gy}$ is a refractive index of a y-axis of the PM fiber, $W$ is a pulse width of the first chirped probe optical pulse, $\vartheta_P$ is a frequency of the pump signal, and $\Delta t = (T_4 - T_3)$ where $T_3$ is the third moment in time of receiving the first reflected signal, and $T_4$ is the fourth moment in time of receiving the second reflected signal.

In some non-limiting implementations, the method further includes sending a second chirped probe optical pulse in the PM fiber at a fifth moment in time subsequent to the third moment in time, the second probe signal being polarized in the second polarization direction, receiving a third reflected signal at a sixth moment in time, the third reflected signal being a third portion of the second chirped probe optical pulse reflected by the BDG at the interaction section of the PM fiber and determining a second variation of birefringence of the PM fiber at the interaction section based on the second, third, fifth and sixth moments in time, the second variation of birefringence being indicative of a variation of physical disturbance of the PM fiber between times of reflections on the BDG of the first and third reflected signals.

In some non-limiting implementations, the pump signal is a continuous wave pump signal.

In some non-limiting implementations, the pump signal is a pulsed pump signal.

In some non-limiting implementations, the first polarization direction is a direction of a slow axis of the PM fiber, and the second polarization direction is a direction of a fast axis of the PM fiber.

In accordance with a first broad aspect of the present disclosure, there is provided a system for determining distributed birefringence variations in a polarization-maintaining optical fiber (PM fiber), the system being optically connected to the PM fiber. The system includes a controller, a detector communicatively connected to the controller and a probe signal generating module. The system is configured to cause a pump signal to be sent into the PM fiber at a first moment in time to generate a Brillouin dynamic grating (BDG) in the PM fiber along a first polarization direction at an interaction region of the PM fiber, the pump signal being polarized in the first polarization direction, cause a first chirped probe optical pulse to be sent into the PM fiber at a second moment in time subsequent to the first moment in time, the first chirped probe signal being polarized in the second polarization direction, the second polarization direction being orthogonal to the first direction, receive, at the detector, a first reflected signal at a third moment in time, the first reflected signal being a first portion of the first chirped probe optical pulse reflected by the BDG, receive, at the detector, a second reflected signal at a fourth moment in time, the second reflected signal being a second portion of the first chirped probe optical pulse reflected by the BDG at the interaction region of the PM fiber and determine a variation of birefringence of the PM fiber at the interaction section based on the second, third and fourth moments in time, the variation of birefringence being indicative of a variation of physical disturbance of the PM fiber between times of reflections on the BDG of the first and second reflected signals.

In some non-limiting implementations, the system further includes a pump laser source optically connected to the PM fiber and configured to generate the pump signal and stimulate the Brillouin dynamic grating along the first polarization direction in the PM fiber.

In some non-limiting implementations, the pump laser source is a narrow linewidth laser source.

In some non-limiting implementations, the pump laser source is configured to emit a continuous wave pump signal.

In some non-limiting implementations, the pump laser source is configured to emit a pulsed pump signal.

In some non-limiting implementations, the probe signal generating module includes a distributed feedback (DFB) laser source and a pulse generator operatively connected to the DFB laser source, the pulse generator being arranged and configured to electrically modulate the DFB laser source to produce chirped optical pulses.

In some non-limiting implementations, the detector is a photodiode detector.

In some non-limiting implementations, the system further includes a bandpass filter upstream from the detector.

In some non-limiting implementations, the system further includes a polarization beam splitter to align the pump signal to a slow axis of the PM fiber, and to align the probe chirped pulse signal to a fast axis of the PM fiber

BRIEF DESCRIPTION OF THE FIGURES

Further features and advantages of the present disclosure will become apparent from the following detailed description, taken in combination with the appended drawings, in which.

It is to be understood that throughout the appended drawings and corresponding descriptions, like features are identified by like reference characters. Furthermore, it is also to be understood that the drawings and ensuing descriptions are intended for illustrative purposes only and that such disclosures do not provide a limitation on the scope of the claims.

DETAILED DESCRIPTION

The instant disclosure is directed to address at least some of the deficiencies of the current technology. In particular, the instant disclosure describes a system and a method for determining distributed birefringence variations in a polarization-maintaining optical fiber.

As used herein, the term "about" or "approximately" refers to a +/−10% variation from the nominal value. It is to be understood that such a variation is always included in a given value provided herein, whether or not it is specifically referred to.

Unless otherwise defined or indicated by context, all technical and scientific terms used herein have the same meaning as commonly understood by one of ordinary skill in the art to which the described implementations appertain to. The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

In the context of the present specification, unless provided expressly otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first processor" and "third processor" is not intended to imply any particular order, type, chronology, hierarchy or ranking (for example) of/between the processor, nor is their use (by itself) intended to imply that any "second processor" must necessarily exist in any given situation. Further, as is discussed herein in other contexts, reference to a "first" element and a "second" element does not preclude the two elements from being the same actual real-world element. Thus, for example, in some instances, a "first" processor and a "second" processor may be the same software and/or hardware, in other cases they may be different software and/or hardware.

It will be understood that when an element is referred to as being "connected" or "coupled" to another element, it can be directly or indirectly connected or coupled to the other element or intervening elements that may be present. In contrast, when an element is referred to as being "directly connected" or "directly coupled" to another element, there are no intervening elements present. Other words used to describe the relationship between elements should be interpreted in a like fashion (e.g., "between" versus "directly between." "adjacent" versus "directly adjacent," etc.).

In the context of the present specification, when an element is referred to as being "associated with" another element, in certain implementations, the two elements can be directly or indirectly linked, related, connected, coupled, the second element employs the first element, or the like without limiting the scope of the present disclosure.

The terminology used herein is only intended to describe particular representative implementations and is not intended to be limiting of the present technology. As used herein, the singular forms "a." "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represents conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor" or a "processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some implementations of the present technology, the processor may be a general-purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, modules, or units which are implied to be software, may be represented herein as any combination of flowchart elements or other elements indicating performance of process steps and/or textual description. Such modules may be executed by hardware that is expressly or implicitly shown.

With these fundamentals in place, the instant disclosure is directed to address at least some of the deficiencies of the current technology. In particular, the instant disclosure describes a system and a method for determining distributed birefringence variations in a polarization-maintaining optical fiber (PM fiber). The birefringence variations are generally caused by mechanical disturbance of the fiber, where stress forces on the fiber produce stress-birefringence therein. The variations thus may be due to a tapping event (i.e. extraction of a small fraction of the optical power propagating through the fiber without causing noticeable signal degradation or loss) or other physical (mechanical) disturbances in the PM fiber.

Figure 1:
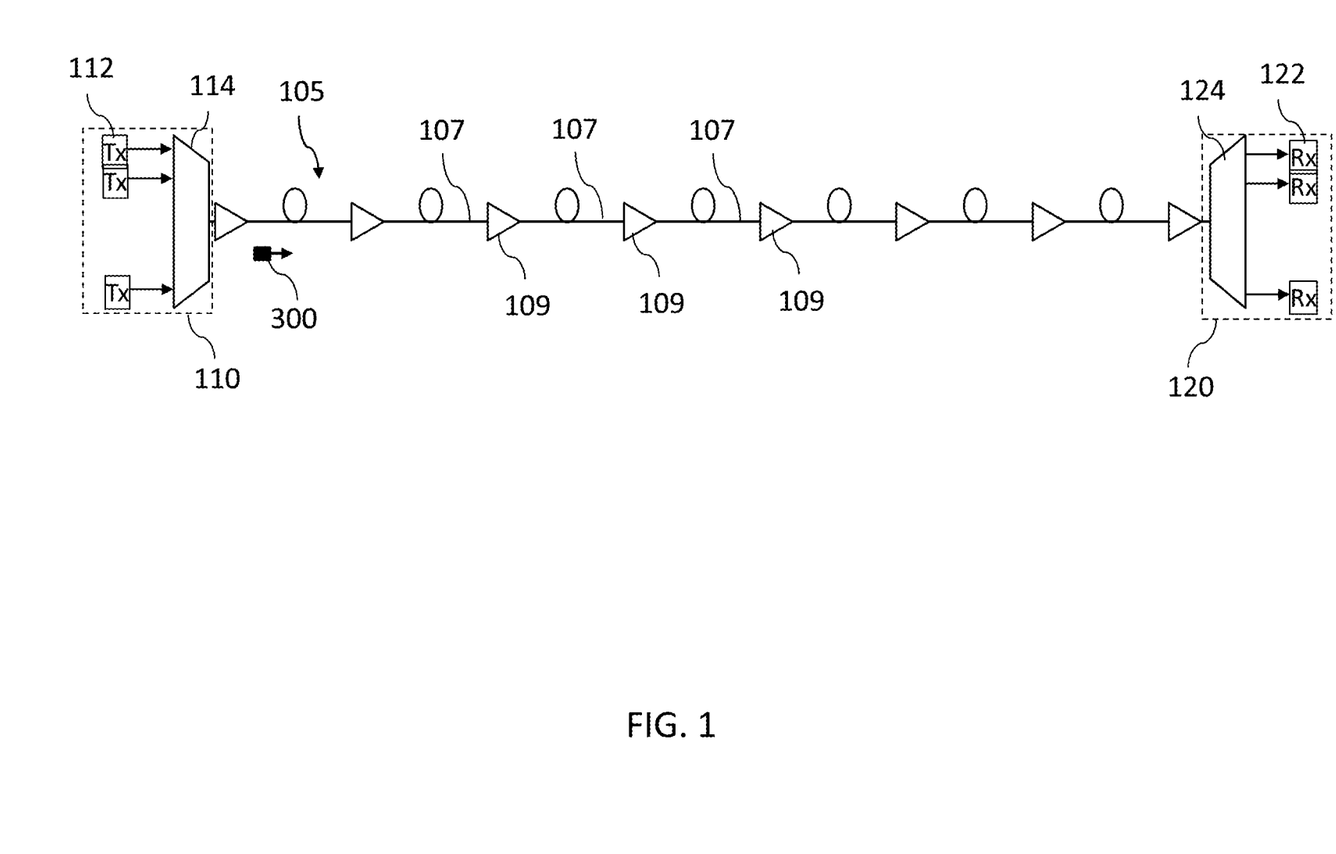
FIG. 1 is a high-level diagram of an optical communication line.

With reference to FIG. 1, a high-level diagram of an optical communication line 105 to which the present technology may be applied is illustrated. The optical communication line 105 communicably connects a transmitting device 110 to a receiving device 120 for transmitting an optical signal 300 therebetween. In this example, the optical communication line 105 is a polarization-maintaining (PM fiber) and is thus referred to as the PM fiber 105. The PM fiber 105 may include an optical fiber core which transmits the optical signal 300, and an optical cladding, which confines the optical signal within the optical fiber core. It is also contemplated that light emitted by the transmitting device 110, thereby defining the optical signal 300, may be single polarized, dual polarized, or randomly polarized, may have a particular polarization (e.g. linearly polarized, elliptically polarized, or circularly polarized).

As depicted, the PM fiber 105 may comprise a plurality of optical amplifiers 109 (e.g., erbium-doped fiber amplifiers (EDFAs)) and placed in a sequence for amplifying the optical signal along the PM fiber 105. Use of one or more additional optical network elements and modules (which may include either or both of active and passive elements/modules), such as, for example, optical filters, Wavelength Selective Switches (WSSs), arrayed waveguide gratings, optical transmitting devices, optical receiving devices, processors and other suitable components along the PM fiber 105 may be contemplated.

For example, the transmitting device 110 may include a plurality of transmitters 112, each transmitter 112 being configured to emit a given signal such that the plurality of emitted signals is combined by a multiplexer 114 operatively coupled to the PM fiber 105. For example and without limitation, each transmitter 112 may be a laser source of a respective wavelength and communicatively connected to a corresponding processing unit (not shown) comprised in the transmitting device 110. The laser source may be configured to produce, emit, or radiate pulses of light with certain pulse duration. One or more transmitters 112 implemented as pulsed laser light sources may include one or more laser diodes, such as but not limited to, Fabry-Perot laser diode, a quantum well laser, a distributed Bragg reflector (DBR) laser, a distributed feedback (DFB) laser, or a vertical-cavity surface-emitting laser (VCSEL). Just as examples, a given laser diode may be an aluminum-gallium-arsenide (AlGaAs) laser diode, an indium-gallium-arsenide (InGaAs) laser diode, or an indium-gallium-arsenide-phosphide (InGaAsP) laser diode, or any other suitable laser diode. The multiplexer 114 may be a passive multiplexer such as, without limitation, a prism-based or a mirror-based multiplexer, or an active multiplexer based on a combination of passive components and tunable detectors, each detector being tuned to a specific frequency.

The receiving device 120 may include a demultiplexer 124 operatively coupled to the PM fiber 105 and configured to receive the optical signal 300 to output a plurality of output signals, each output signal being further directed to a corresponding receiver 122 of the receiving device 120. For example, the demultiplexer 124 may be configured to output the outputs signals based on wavelength such that each receiver 122 corresponds to one of the transmitters 112. More specifically, the demultiplexer 124 may separate the optical signal 300, comprising the plurality of wavelengths emitted by the plurality of transmitters 112, into its wavelength components. The demultiplexer 124 may be a passive multiplexer, such as without limitation a prism-based, diffraction grating-based, or spectral filter-based demultiplexer, or an active demultiplexer based on a combination of passive components and tunable detectors, each detector being tuned to a specific frequency. In this embodiment, the receivers 122 are photodiodes, each receiver 122 having its central wavelength corresponding to the wavelength emitted by its corresponding transmitter 112. Other types of receivers 122 may be contemplated.

It is an object of the present technology to provide real-time monitoring of birefringence variations without being limited by the acquisition rate. In one aspect, the present technology also provides a spatial resolution that is not limited by pulse width of a probe signal used to perform the birefringence variation measurement. Finally, in another aspect, the present technology aims at addressing measurement accuracy limitation of known technologies by removing the requirement of frequency sweep process and Brillouin dynamic grating (BDG) gain spectrum recovery.

Figure 2:
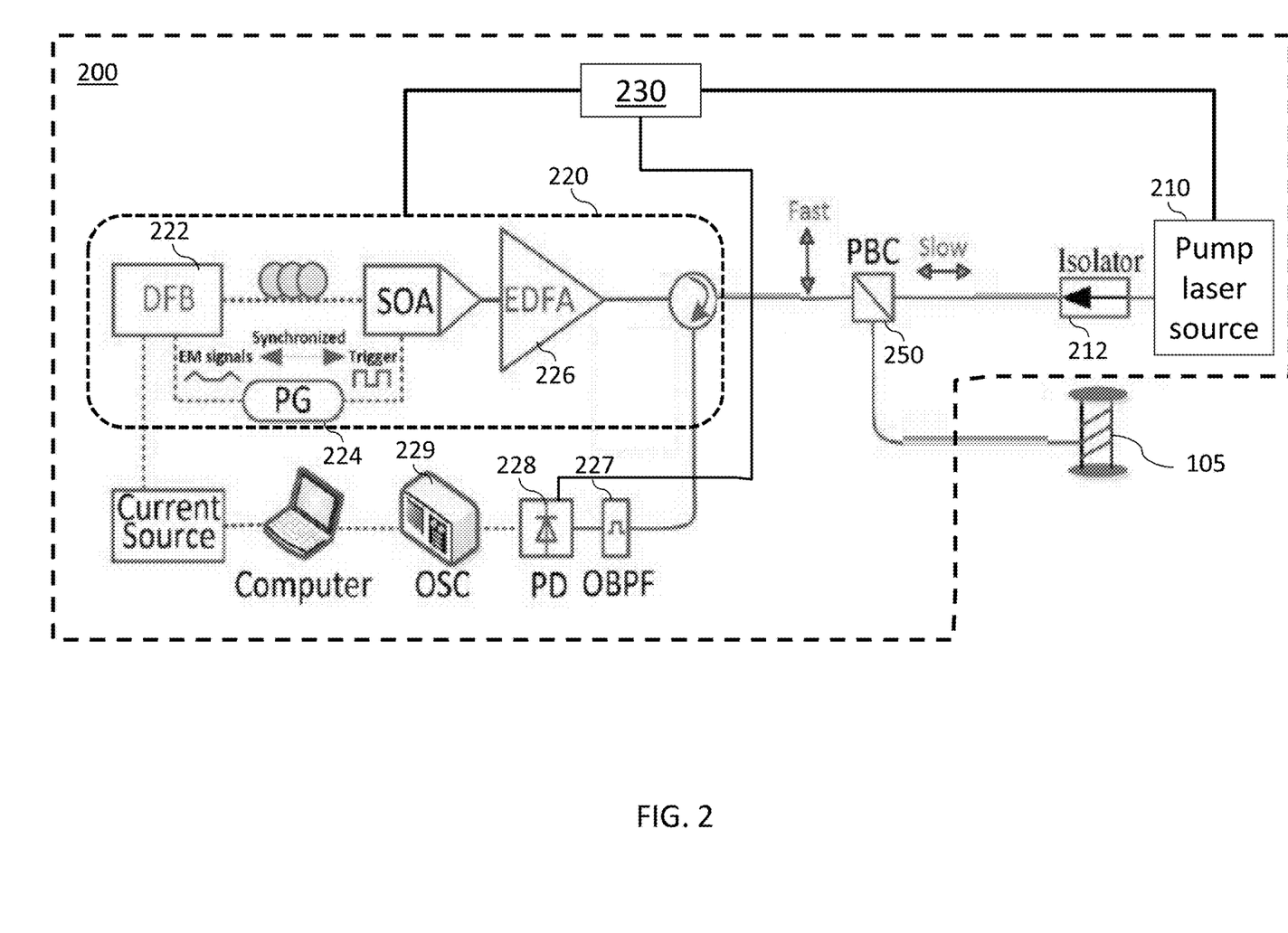
FIG. 2 is a high-level diagram of a system for determining distributed birefringence variations in a polarization-maintaining optical fiber (PM fiber) in accordance with some implementations of the present technology.

FIG. 2 illustrates a system 200 for determining distributed birefringence variations in the PM fiber 105 according to a non-limiting implementation of the present technology. As shown, the system 200 includes a pump laser source 210, a probe signal generating module 220, and a controller 230 communicably connected thereto and aims at determining distributed birefringence variations in the PM fiber 105.

The pump laser source 210 generates a pump signal to be sent into the PM fiber 105 at a first moment in time to generate a BDG in the PM fiber 105. The pump signal may be a continuous wave (CW) pump signal or a pulsed pump signal. In some implementations, the pump laser source 210 is a narrow linewidth laser. A linewidth of the pump laser source 210 may be several hundreds of Hz up to several MHz of range. For example and without limitation, the wavelength of pump signal may be in a relatively large range centered at about 1550 nm. The system 200 may include an isolator 212 at an output of the pump laser source 210.

In this implementation, the BDG is generated in response to propagation of the pump signal generated by the pump laser source 210. More specifically, once the optical power of the pump signal is of sufficient strength, a generated Stokes wave counter-propagates with the pump signal and interacts with pump signal to stimulate the BDG in the PM fiber 105. In alternative implementations, a Stokes wave is sent from the other end of the PM fiber 105 to counter-propagates with the pump signal. Said Stokes wave acts as a seed signal to enhance the BDG through electrostriction.

Broadly speaking, the probe signal generating module 220 is configured to generate chirped probe optical pulses to be sent in the PM fiber 105. More specifically, the probe signal generating module 220 includes a distributed feedback (DFB) laser source 222 directly modulated by an electrical modulation (EM) signal generated by a pulse generator 224. In some implementations, the probe signal generating module 220 includes an optical amplifier 226 (e.g. Erbium-doped optical fiber amplifier) to modulate the optical signal generated by the DFB laser source 222. The modulated signal forms a chirped probe optical pulse. In some implementations, the chirped probe optical pulse has a linear frequency profile.

In the illustrated implementation of FIG. 2, polarizations of the pump signal and the chirped probe optical pulse are adjusted by polarization controllers before being transmitted to the PM fiber 105 through a polarization beam combiner (PBC) 250. More specifically, the pump signal is polarized in a first polarization direction and the chirped probe optical pulse is polarized in a second polarization direction orthogonal to the first polarization direction. Therefore, the Brillouin dynamic grating (BDG) is generated in the PM fiber 105 along the first polarization direction.

In this implementation, the pump signal is polarized along a slow axis of the PM fiber 105 to excite the BDG in the slow axis, and the chirped probe optical pulse is polarized along a fast axis of the PM fiber 105. In an alternative implementation, the pump signal is polarized along a fast axis of the PM fiber 105 to excite the BDG in the fast axis, and the chirped probe optical pulse is polarized along a slow axis of the PM fiber 105.

Figure 3:
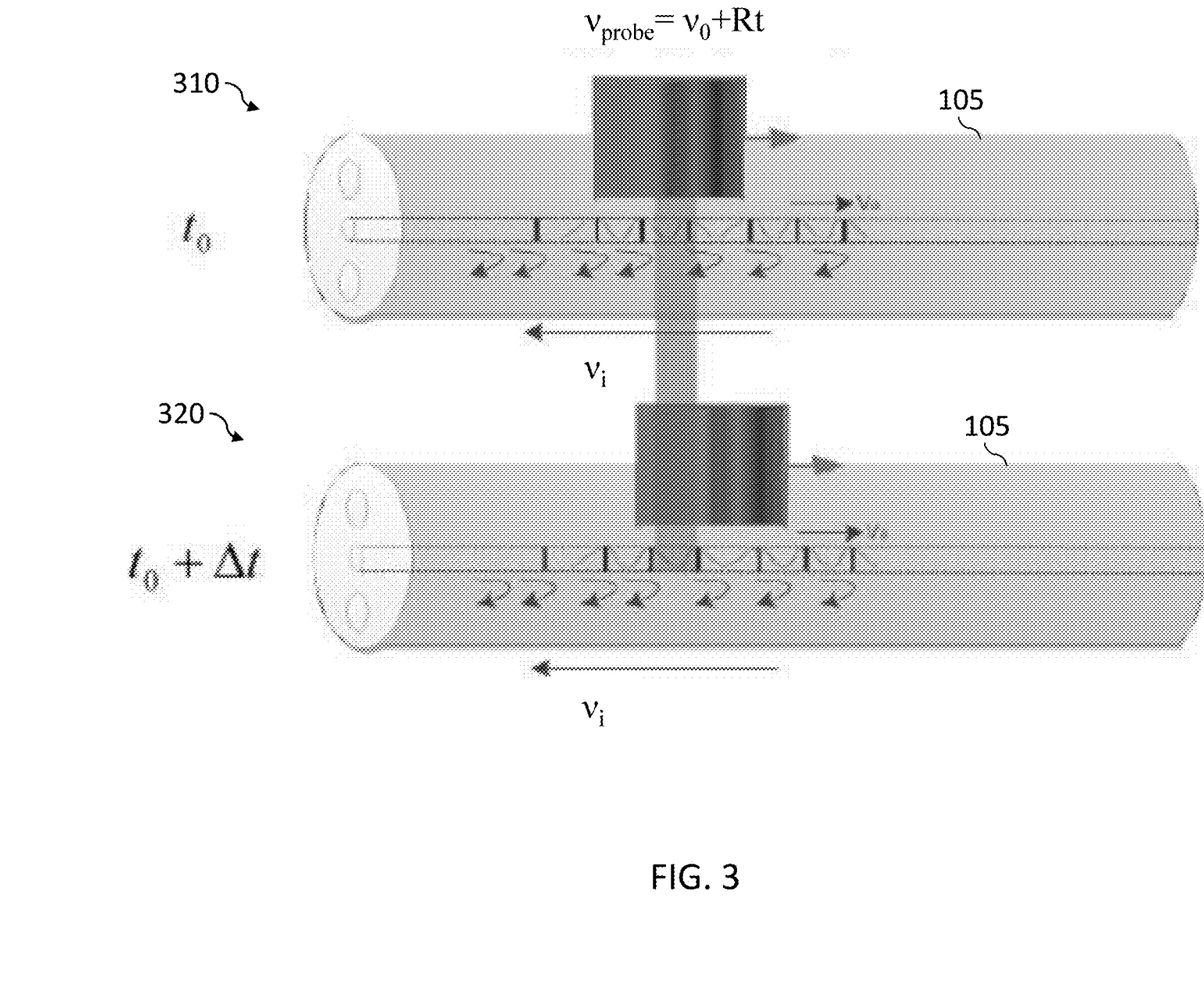
FIG. 3 is a graph of frequency distributions of optical signals processed by the system of FIG. 2.
Figure 4:
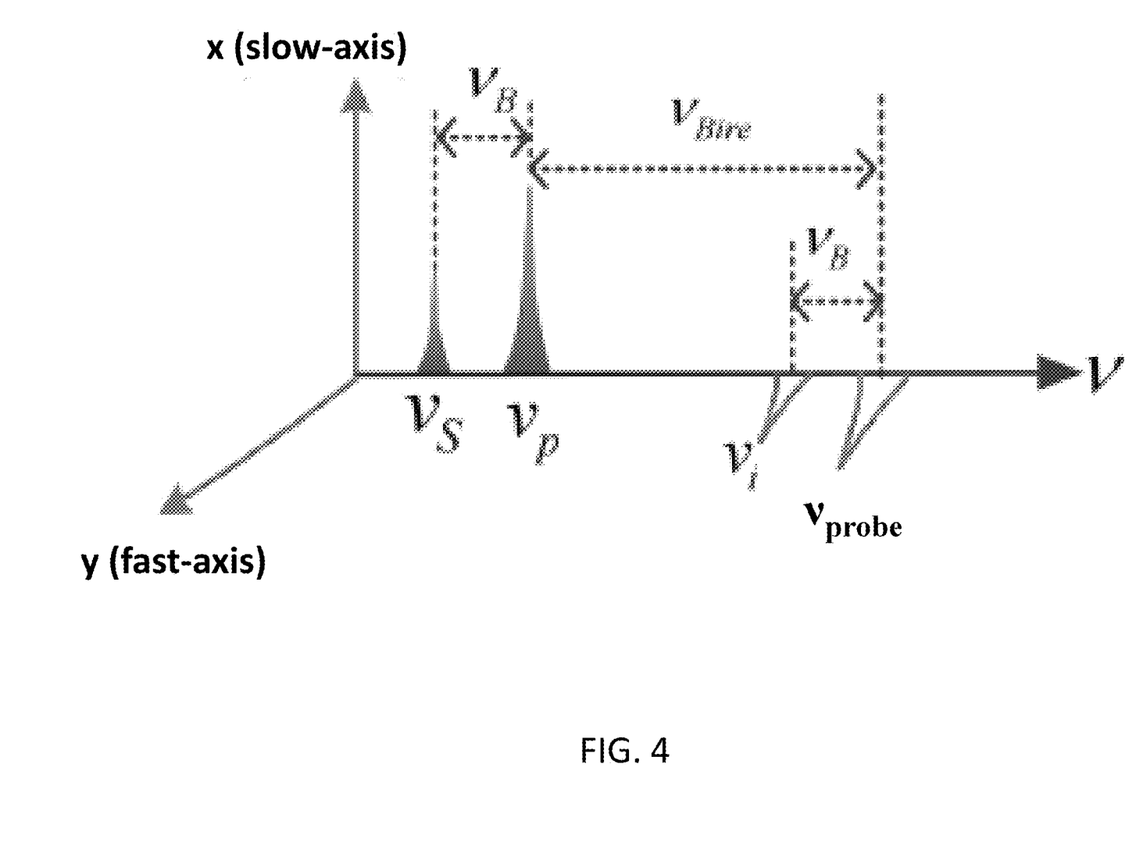
FIG. 4 is a representation of a transmission of a chirped probe optical pulse in a PM fiber at two successive moments in time in accordance with some implementations of the present technology.

FIGS. 3 and 4 illustrate the principle of time delay measurement in PM fiber 105 for physical disturbances (e.g. temperature and/or strain) measurement. In an aspect, the present technology enables measurement of distributed birefringence variations in a PM fiber using a "single-shot" of a chirped probe optical pulse. Representation 310 of FIG. 3 shows a position of a chirped probe pulse at a given time t0 and the representation 320 of FIG. 3 shows a position of another or the same chirped probe pulse at a later given time $t_0+\Delta t$. A distribution of the frequencies of the chirped probe pulse $v_{probe}$, the pump signal $v_p$, the idler signal $v_i$ and a Stockes wave $v_s$, resulting from the interaction of the pump signal with the PM fiber 105 material, along the fast and slow axis of the PM fiber 105.

In some implementations and as shown in FIG. 3, the chirped probe pulse has a linearly chirped frequency profile with an instantaneous frequency of $v_{probe}=v_0+Rt$ at the interaction section of the PM fiber 105, where $v_0$ is the initial optical frequency, $R=\Delta v_c/W$, $\Delta v_c$ is frequency chirping range of the chirped probe optical pulse W is a pulse width of the chirped probe optical pulse and R is the frequency chirping rate.

Broadly speaking, the chirped probe pulse has a relatively wide frequency profile such that at least one portion of the frequency profile matches a local birefringence-induced frequency offset of the PM fiber 105, also referred to as a "phase-matching condition", at an interaction section thereof. In this illustrative example, the given time $t_0$, the frequency components within the highlighted band satisfy the local birefringence-induced frequency offset between the pump signal having a main frequency of $v_p$ and chirped probe optical pulse and are located within the BDG gain spectrum. Thus, the frequency components within the highlighted band are reflected by the BDG, thereby generating a first idler signal having a main frequency $v_i$ having a specific power intensity which is the sum of the interaction between each frequency component and the BDG.

If there are temperature or strain variations in the interaction section of the PM fiber 105 in the subsequent measurement, the frequency offset between the pump signal and chirped probe optical pulse that is used to satisfy the phase-matching condition will change accordingly and thus change the optical power of the idler signal.

Representation 320 of FIG. 3 shows a position of the chirped probe pulse at a given different time $t_0+\Delta t$. The frequency components of the chirped probe optical pulse located have shifted since that, in this implementation, the optical frequency is linearly varied within the chirped probe optical pulse. In this example, the frequency components within the highlighted band are reflected by the BDG, thereby generating a second idler signal. In use, the frequency change of each component at a different given time will compensate for the birefringence variation-induced frequency offset ($v_{Bire}$) variation to give an equal power intensity. It should be noted that the birefringence variation-induced frequency offset $v_{Bire}$ depends on the birefringence $\Delta n$ (i.e. a difference between refractive index of the slow axis and the fast axes) of the PM fiber 105. In this implementation, it is assumed that the power intensity of each frequency component within the chirped probe optical pulse is similar. Therefore, the birefringence variations indicative of physical disturbances may be directly measured by the local time delay within the selected time window in two adjacent time domain reflected idler signals from the BDG.

Referring back to FIG. 2, the system 200 also includes a detector 228 communicatively connected to the controller 230 to sense to idler signals being reflected portion of the chirped probe optical pulses reflected by the BDG. The detector 228 is a photodiode (PD) detector 228 in the present embodiment, although different detectors are contemplated. The system 200 includes an optical band-pass filter (OBPF) 227 such that only the idler signals are detected at the detector 228. By the present embodiment, the system 200 also includes include an oscilloscope 229 communicably connected to the controller 230 to collect a time domain of the reception of the idler signals. In some implementations, the oscilloscope 229 may additionally control a drive current of the DFB laser source 222 to change the initial optical frequency for simulation purposes.

In use, the controller 230 receives data provided by the detector 228 and determines a variation of birefringence ($\Delta B$) of the optical fiber at the interaction section using the following equation:

$$\Delta B = \frac{\Delta \vartheta_C \cdot n_{gy}}{W \cdot \vartheta_P} \cdot \Delta t \qquad (1)$$

where $\Delta \vartheta_C$ is a frequency chirping range of the chirped probe optical pulse, $n_{gy}$ is a refractive index of a fast axis of the PM fiber 105, W is a pulse width of the chirped probe optical pulse, $\vartheta_p$ is a frequency of the pump signal, and $\Delta t$ is a time difference between reception of the first and second idler signals.

Broadly speaking, in response to the birefringence varying (e.g. due to physical disturbances thereof), the first and second idler signals reflected from the BDG may have a same intensity, since the time difference ($\Delta t$) corresponding to a frequency difference that used to compensate the local birefringence variations induced frequency offset (i.e. the frequency difference between the pump signal and the chirped probe optical pulse) changes.

It should be noted that, in this implementation, the chirped probe optical pulse at representations 310 and 320 is the same. However, implementations where a different chirped probe optical pulse is emitted by the pulse generating module 220 later in time to obtain the second idler signal from a reflection thereof on the BDG are also contemplated. In these implementations, a time between emissions of the two chirped probe optical pulses affects a sampling rate of the system 200 is retrieved from $\Delta t$ in equation (1).

Figure 5:
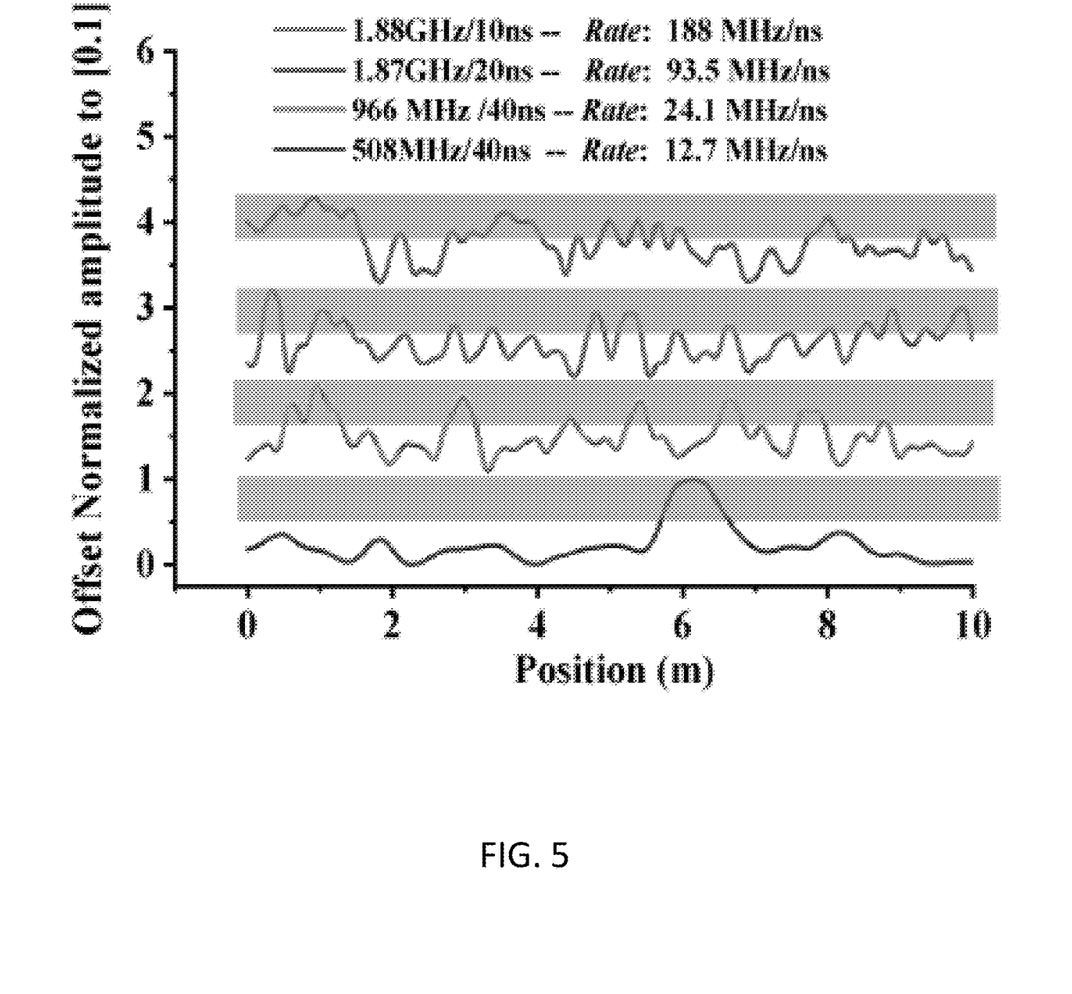
FIG. 5 is a chart illustrating experimental measurements relative to spatial resolution of the system of FIG. 2 for different chirping rates of the chirped probe optical pulse in accordance with some implementations of the present technology.

FIG. 5 illustrates a simulated evolution of optical power of the received idler signals according to a width of the interaction section in the PM fiber 105 for different chirping rate of the chirped probe optical pulse. It can be seen that smaller chirping rate gives a longer effective collision width, and average out the fast fluctuations of the birefringence in the PM fiber 105. By removing the requirement of frequency sweep process and (BDG) gain spectrum recovery executed in other technologies, the time delay measurement based on BDG reflected idler signals offers ultra-high accuracy, which is only limited by the sampling rate and chirping rate of pulse. As one non-limiting example, an experimental sampling rate of 40 Gigasamples per second, namely a time resolution of 25 ps, has been reached.

Figure 6:
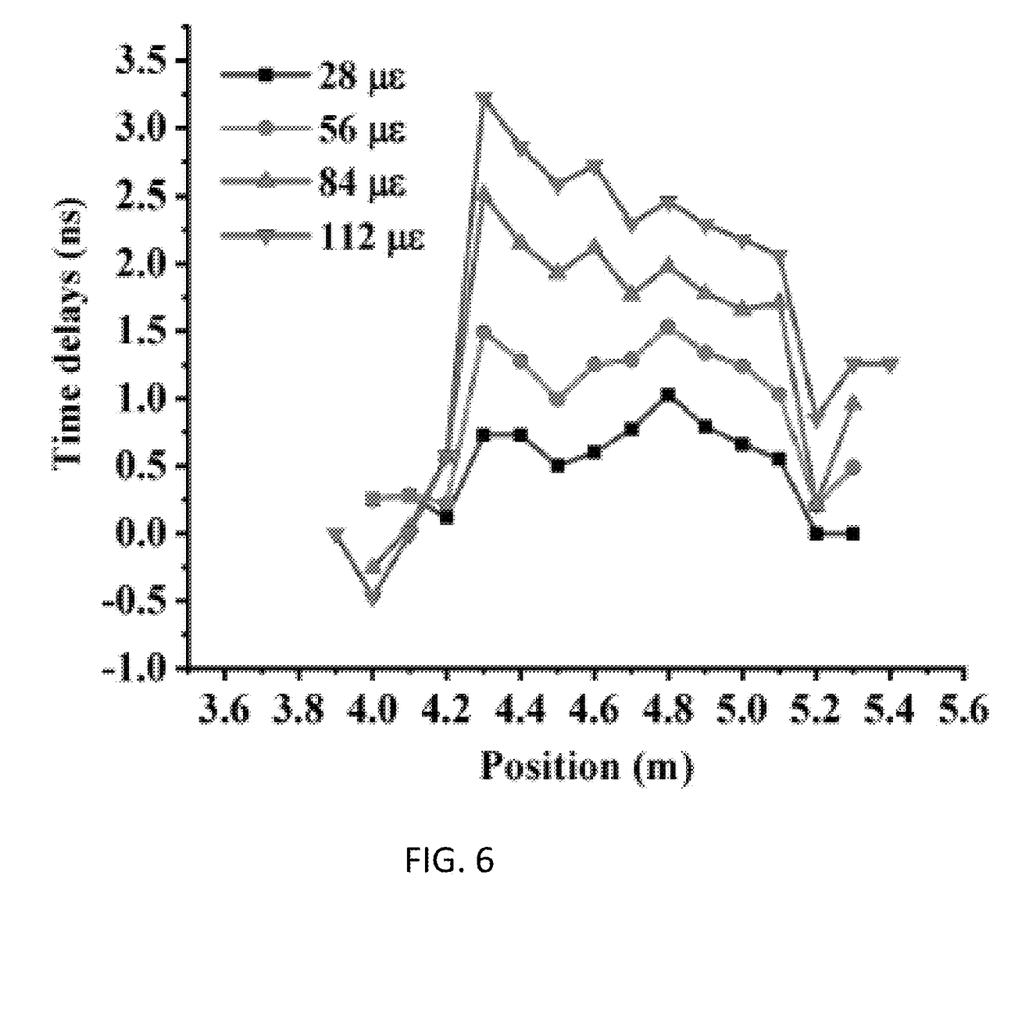
FIG. 6 is a chart illustrating experimental measurements relative to spatial resolution of the system of FIG. 2 for different strain applied to the PM fiber.

FIG. 6 shows simulated evolution of the time delay Δt along the length of the PM fiber for different strain forces applied to the PM fiber. It can be seen that the spatial resolution of the measurement has been further improved, since only small portion of the light within the pulse width is reflected by BDG. Compared with single-frequency pulse of the same pulse width, the different optical frequency components in chirped probe optical pulse take much smaller time section among the entire pulse width, which allows precise spectrum scanning in a smaller time window than the pulse width.

Figure 7:
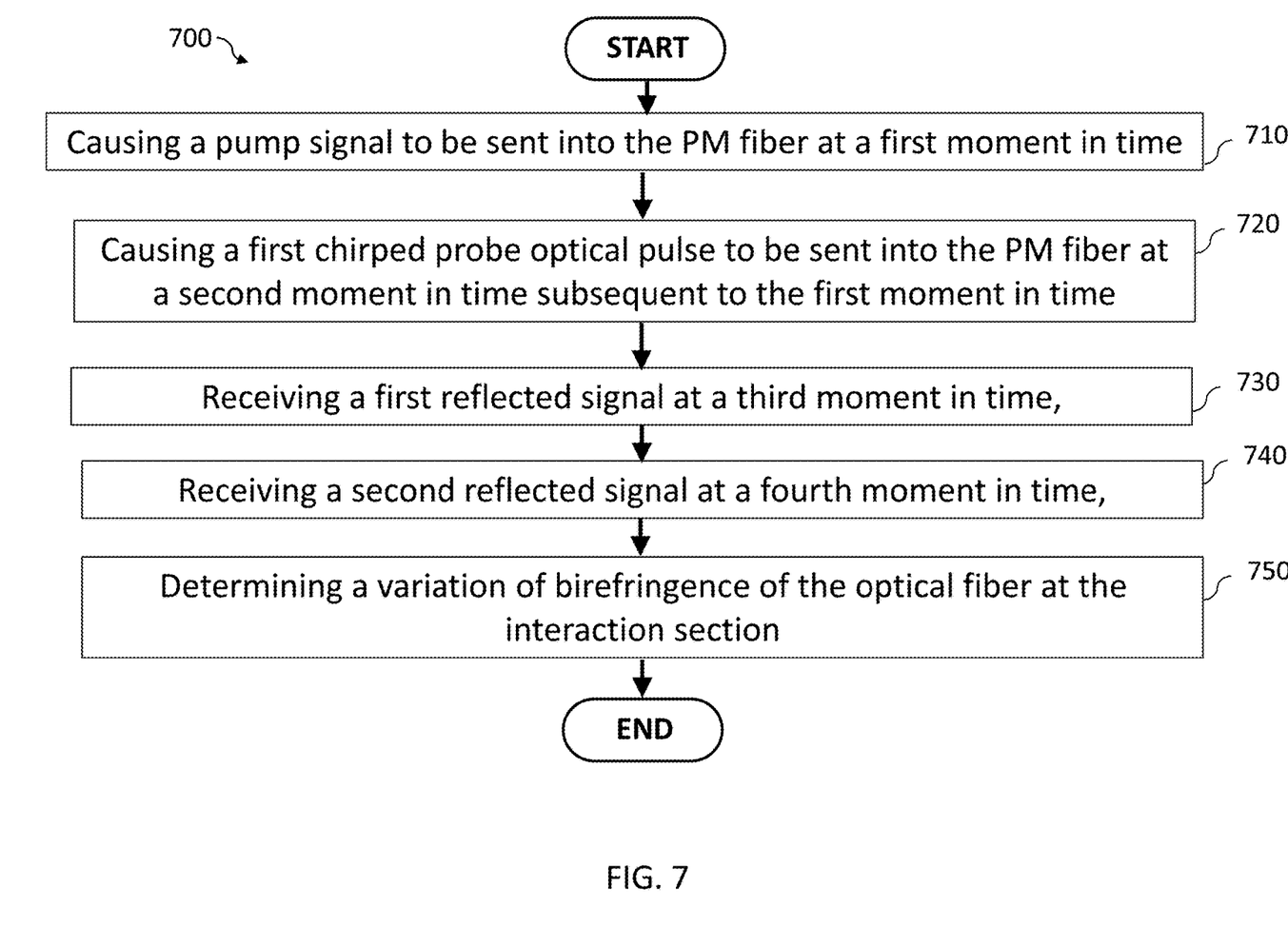
FIG. 7 is a flow diagram representing operations of a method for determining distributed birefringence variations in a polarization-maintaining optical fiber in accordance with some implementations of the present technology.

FIG. 7 is a flow diagram of a method 700 for determining distributed birefringence variations in a polarization-maintaining optical fiber (PM fiber) such as the PM fiber 105, according to some implementations of the present technology. In one or more aspects, the method 700 or one or more steps thereof may be performed by a processor or a computer-implemented system comprising a controller, such as the system 200. The method 700 or one or more steps thereof may be embodied in computer-executable instructions that are stored in a computer-readable medium, such as a non-transitory mass storage device, loaded into memory and executed by a CPU. Some steps or portions of steps in the flow diagram may be omitted or changed in order.

The method 700 starts with causing, at operation 710, a pump signal to be sent into the PM fiber 105 by the DFB laser 222 at a first moment in time to generate a Brillouin dynamic grating (BDG) in the PM fiber 105 along a first polarization direction at an interaction region of the PM fiber 105, the pump signal being polarized in the first polarization direction. In some implementations, the first polarization direction is a slow axis of the PM fiber 105. In the same or other implementations, a wavelength profile of the pump signal is centered at 1550 nm. The pump signal may be a continuous wave pump signal or a pulsed pump signal.

The method 700 continues with causing, at operation 720, a first chirped probe optical pulse to be sent into the PM fiber 105 at a second moment in time subsequent to the first moment in time, the first chirped probe signal being polarized in the second polarization direction, the second polarization direction being orthogonal to the first direction. The first chirped probe optical pulse may have a linear frequency profile. In some implementations, the second polarization direction is a fast axis of the PM fiber. In the same or other implementations, the first chirped probe optical pulse has a uniform optical power profile.

In some implementations, generating the BDG in the PM fiber 105 includes injecting the pump signal into the PM fiber 105 via a first end thereof, and causing the first chirped probe optical pulse to be sent includes injecting the first chirped probe optical pulse into the optical fiber via a second end, the second end being different from the first end The method 700 continues with receiving, at operation 730, a first reflected signal at a third moment in time, the first reflected signal being a first portion of the first chirped probe optical pulse reflected by the BDG.

The method 700 continues with receiving, at operation 740, a second reflected signal at a fourth moment in time, the second reflected signal being a second portion of the first chirped probe optical pulse reflected by the BDG at the interaction region of the optical fiber.

The method 700 continues with determining, at operation 750, a variation of birefringence of the optical fiber at the interaction section based on the second and third moments in time, the variation of birefringence being indicative of a variation of physical disturbance of the optical fiber between times of reflections on the BDG of the first and second reflected signals. In some implementations, determining the variation of birefringence (ΔB) of the PM fiber at the interaction section includes determining the value:

$$\Delta B = \frac{\Delta \vartheta_C \cdot n_{gy}}{W \cdot \vartheta_P} \cdot \Delta t$$

where $\Delta \vartheta_C$ is a frequency chirping range of the chirped probe optical pulse, $n_{gy}$ is a refractive index of a y-axis of the PM fiber, W is a pulse width of the first chirped probe optical pulse, $\vartheta_P$ is a frequency of the pump signal, and Δt is a time difference between the third moment in time of receiving the first reflected signal (i.e. first idler signal), and the fourth moment in time of receiving the second reflected signal (i.e. second idler signal).

In some implementations, the method 700 further includes sending a second chirped probe optical pulse in the PM fiber at a fifth moment in time subsequent to the third moment in time, the second probe signal being polarized in the second polarization direction and receiving a third reflected signal at a sixth moment in time. The third reflected signal is a portion of the second chirped probe optical pulse reflected by the BDG at the interaction section of the PM fiber. In these implementations, the method 700 further includes determining a second variation of birefringence of the PM fiber at the interaction section based on the second, third, fifth and sixth moments in time, the second variation of birefringence being indicative of a variation of physical disturbance of the PM fiber between times of reflections on the BDG of the first and third reflected signals.

It will be appreciated that at least some of the operations of the method 600 may also be performed by computer programs, which may exist in a variety of forms, both active and inactive. Such as, the computer programs may exist as software program(s) comprised of program instructions in source code, object code, executable code or other formats. Any of the above may be embodied on a computer readable medium, which include storage devices and signals, in compressed or uncompressed form. Representative computer readable storage devices include conventional computer system RAM (random access memory), ROM (read only memory), EPROM (erasable, programmable ROM), EEPROM (electrically erasable, programmable ROM), and magnetic or optical disks or tapes. Representative computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general.

Therefore, it can be said that the method 700 is a method for interrogation of Brillouin Dynamic gratings (BDG) by sending chirped probe optical pulse signals for distributed birefringence measurement.

Figure 8:
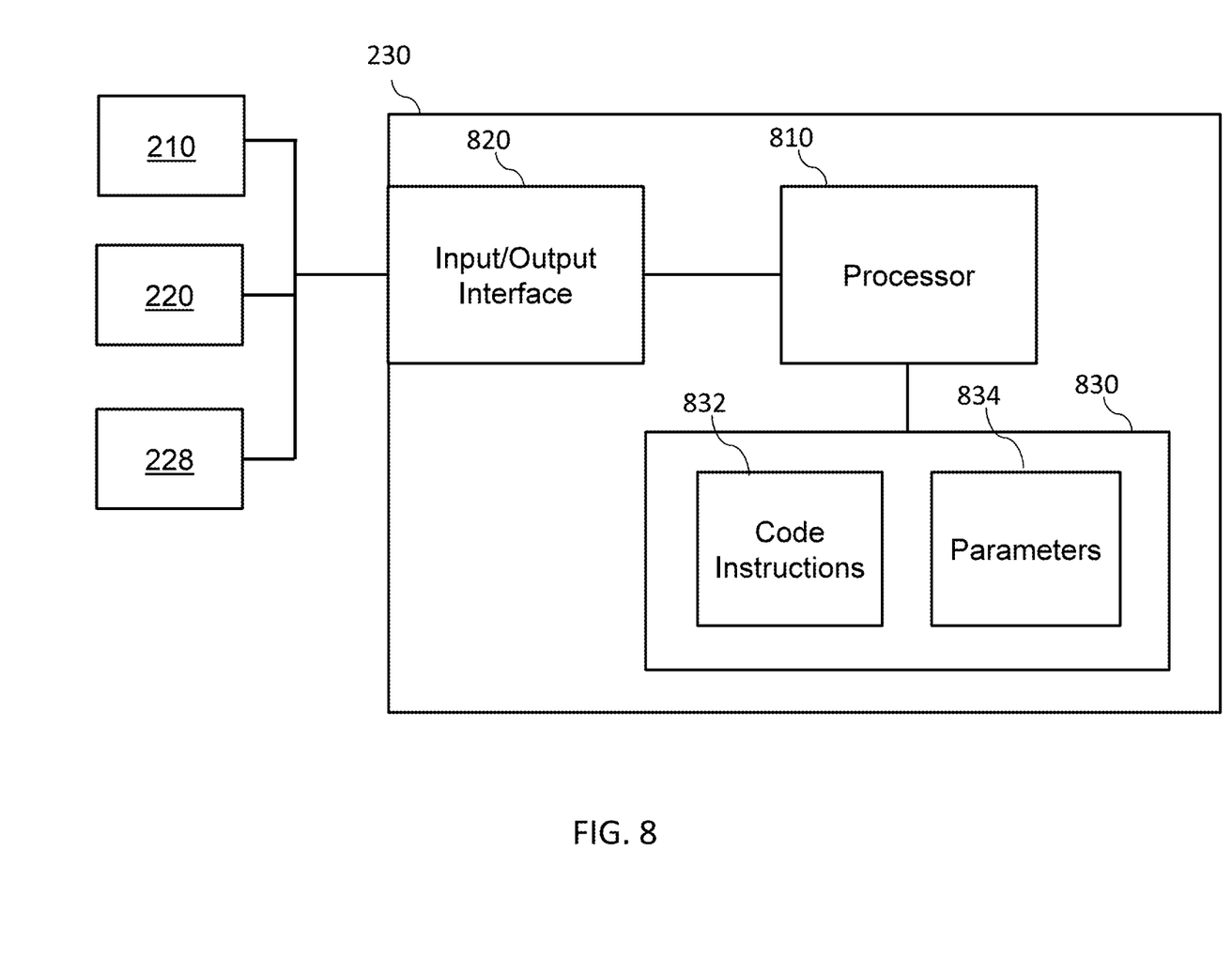
FIG. 8 is block diagram of a controller of the system of FIG. 2 in accordance with some implementations of the present technology.

FIG. 8 is a schematic block diagram of the controller 230 of the system 200 according to one non-limiting implementation of the present technology. The controller 230 comprises a processor or a plurality of cooperating processors (represented as a processor 810 for simplicity), a memory device or a plurality of memory devices (represented as a memory device 830 for simplicity), and an input/output interface 820 allowing the controller 230 to communicate with other components of the system 200 and/or other components in remote communication with the system 200. The processor 810 is operatively connected to the memory device 830 and to the input/output interface 820. The memory device 830 includes a storage for storing parameters 834. The memory device 830 may comprise a non-transitory computer-readable medium for storing code instructions 832 that are executable by the processor 810 to allow the controller 230 to perform the various tasks allocated to the controller 230 in the method 700.

The controller 230 is operatively connected, via the input/output interface 820, to the pump laser source 210, the detector 228, the probe signal generating module 220 and, additionally or optionally, any other components of the system 200. The controller 230 executes the code instructions 832 stored in the memory device 830 to implement the various above-described functions that may be present in a particular implementation. FIG. 8 as illustrated represents a non-limiting implementation in which the controller 230 orchestrates operations of the system 200. This particular implementation is not meant to limit the present disclosure and is provided for illustration purposes.

It is to be understood that the operations and functionality of the described system 200, its constituent components, and associated processes may be achieved by any one or more of hardware-based, software-based, and firmware-based elements. Such operational alternatives do not, in any way, limit the scope of the present disclosure.

It will also be understood that, although the implementations presented herein have been described with reference to specific features and structures, it is clear that various modifications and combinations may be made without departing from such disclosures. The specification and drawings are, accordingly, to be regarded simply as an illustration of the discussed implementations or implementations and their principles as defined by the appended claims, and are contemplated to cover any and all modifications, variations, combinations or equivalents that fall within the scope of the present disclosure.

What is claimed is:

1. A method for determining distributed birefringence variations in a polarization-maintaining optical fiber (PM fiber), the method being executed by a computer-implemented system comprising a controller, the method comprising:
    causing a pump signal to be sent into the PM fiber at a first moment in time to generate a Brillouin dynamic grating (BDG) in the PM fiber along a first polarization direction at an interaction region of the PM fiber, the pump signal being polarized in the first polarization direction;
    causing a first chirped probe optical pulse to be sent into the PM fiber at a second moment in time subsequent to the first moment in time, the first chirped probe signal being polarized in the second polarization direction, the second polarization direction being orthogonal to the first direction;
    receiving a first reflected signal at a third moment in time, the first reflected signal being a first portion of the first chirped probe optical pulse reflected by the BDG;
    receiving a second reflected signal at a fourth moment in time, the second reflected signal being a second portion of the first chirped probe optical pulse reflected by the BDG at the interaction region of the PM fiber; and
    determining a variation of birefringence of the PM fiber at the interaction section based on the second, third and fourth moments in time, the variation of birefringence being indicative of a variation of physical disturbance of the PM fiber between times of reflections on the BDG of the first and second reflected signals.

2. The method of claim 1, wherein:
    causing the first chirped probe optical pulse to be sent comprises producing a first chirped pulse having a linear frequency profile.

3. The method of claim 1, wherein:
    causing the first chirped probe optical pulse to be sent comprises producing a first chirped pulse having a uniform optical power profile.

4. The method of claim 1, wherein:
    generating the BDG in the PM fiber comprises injecting the pump signal into the PM fiber via a first end; and
    causing the first chirped probe optical pulse to be sent comprises injecting the first chirped probe optical pulse into the PM fiber via a second end, the second end being different from the first end.

5. The method of claim 1, wherein a wavelength profile of the pump signal is centered at 1550 nm.

6. The method of claim 1, wherein determining the variation of birefringence ($\Delta B$) of the PM fiber at the interaction section comprises determining:

$$\Delta B = \frac{\Delta \vartheta_C \cdot n_{gy}}{W \cdot \vartheta_P} \cdot \Delta t$$

where $\Delta \vartheta_C$ is a frequency chirping range of the chirped probe optical pulse,
$n_{gy}$ is a refractive index of a y-axis of the PM fiber,
W is a pulse width of the first chirped probe optical pulse,
$\vartheta_P$ is a frequency of the pump signal, and
$\Delta t = (T_4 - T_3)$ where:
    $T_3$ is the third moment in time of receiving the first reflected signal, and
    $T_4$ is the fourth moment in time of receiving the second reflected signal.

7. The method of claim 1, further comprising:
    sending a second chirped probe optical pulse in the PM fiber at a fifth moment in time subsequent to the third moment in time, the second probe signal being polarized in the second polarization direction;
    receiving a third reflected signal at a sixth moment in time, the third reflected signal being a third portion of the second chirped probe optical pulse reflected by the BDG at the interaction section of the PM fiber; and
    determining a second variation of birefringence of the PM fiber at the interaction section based on the second, third, fifth and sixth moments in time, the second variation of birefringence being indicative of a variation of physical disturbance of the PM fiber between times of reflections on the BDG of the first and third reflected signals.

8. The method of claim 1, wherein the pump signal is a continuous wave pump signal.

9. The method of claim 1, wherein the pump signal is a pulsed pump signal.

10. The method of claim 1, wherein the first polarization direction is a direction of a slow axis of the PM fiber, and the second polarization direction is a direction of a fast axis of the PM fiber.

11. A system for determining distributed birefringence variations in a polarization-maintaining optical fiber (PM fiber), the system being optically connected to the PM fiber, the system comprising:
   a controller;
   a detector communicatively connected to the controller; and
   a probe signal generating module,
   the system being configured to:
      cause a pump signal to be sent into the PM fiber at a first moment in time to generate a Brillouin dynamic grating (BDG) in the PM fiber along a first polarization direction at an interaction region of the PM fiber, the pump signal being polarized in the first polarization direction;
      cause a first chirped probe optical pulse to be sent into the PM fiber at a second moment in time subsequent to the first moment in time, the first chirped probe signal being polarized in the second polarization direction, the second polarization direction being orthogonal to the first direction;
      receive, at the detector, a first reflected signal at a third moment in time, the first reflected signal being a first portion of the first chirped probe optical pulse reflected by the BDG receive, at the detector, a second reflected signal at a fourth moment in time, the second reflected signal being a second portion of the first chirped probe optical pulse reflected by the BDG at the interaction region of the PM fiber; and
      determine a variation of birefringence of the PM fiber at the interaction section based on the second, third and fourth moments in time, the variation of birefringence being indicative of a variation of physical disturbance of the PM fiber between times of reflections on the BDG of the first and second reflected signals.

12. The system of claim 11, further comprising a pump laser source optically connected to the PM fiber and configured to generate the pump signal and stimulate the Brillouin dynamic grating along the first polarization direction in the PM fiber.

13. The system of claim 12, wherein the pump laser source is a narrow linewidth laser source.

14. The system of claim 12, wherein the pump laser source is configured to emit a continuous wave pump signal.

15. The system of claim 12, wherein the pump laser source is configured to emit a pulsed pump signal.

16. The system of claim 11, wherein the probe signal generating module comprises:
   a distributed feedback (DFB) laser source; and
   a pulse generator operatively connected to the DFB laser source, the pulse generator being arranged and configured to electrically modulate the DFB laser source to produce chirped optical pulses.

17. The system of claim 11, wherein the detector is a photodiode detector.

18. The system of claim 11, further comprising a bandpass filter upstream from the detector.

19. The system of claim 11, further comprising a polarization beam splitter to align the pump signal to a slow axis of the PM fiber, and to align the probe chirped pulse signal to a fast axis of the PM fiber.

* * * * *